(12) United States Patent
Jang et al.

(10) Patent No.: US 9,108,389 B2
(45) Date of Patent: Aug. 18, 2015

(54) METAL-COLORED AND NON-CONDUCTIVE TRANSFER FILM

(75) Inventors: Dong Sik Jang, Busan (KR); Seung Hun Lee, Ulsan (KR)

(73) Assignee: LG Hausys, Ltd., Seoul (KR)

( * ) Notice: Subject to any disclaimer, the term of this patent is extended or adjusted under 35 U.S.C. 154(b) by 31 days.

(21) Appl. No.: 13/979,312

(22) PCT Filed: Jan. 11, 2012

(86) PCT No.: PCT/KR2012/000274
§ 371 (c)(1),
(2), (4) Date: Jul. 11, 2013

(87) PCT Pub. No.: WO2012/096512
PCT Pub. Date: Jul. 19, 2012

(65) Prior Publication Data
US 2013/0295348 A1    Nov. 7, 2013

(30) Foreign Application Priority Data

Jan. 13, 2011 (KR) .................. 10-2011-0003411

(51) Int. Cl.
B41M 5/382 (2006.01)
B32B 15/04 (2006.01)
B44C 1/17 (2006.01)

(52) U.S. Cl.
CPC ............ *B32B 15/04* (2013.01); *B41M 5/38214* (2013.01); *B44C 1/1704* (2013.01); *B44C 1/1716* (2013.01); *B44C 1/1729* (2013.01); *B41M 2205/30* (2013.01); *B41M 2205/38* (2013.01); *Y10T 428/24851* (2015.01)

(58) Field of Classification Search
CPC ............. B41M 5/382; B41M 5/38214; B41M 2205/30; B41M 2205/38; B32B 15/04; B44C 1/04; B44C 1/17; B44C 1/1704; B44C 1/1716; B44C 1/1729; Y10T 428/24851; Y10T 428/24917
USPC ...................... 428/32.79, 201, 209
See application file for complete search history.

(56) References Cited

U.S. PATENT DOCUMENTS 7,413,794 B2 * 8/2008 Shigemura ................. 428/195.1
2006/0216442 A1    9/2006 Kamiya et al.

FOREIGN PATENT DOCUMENTS

| CN | 001792638 A | 6/2006 |
| CN | 001838482 A | 9/2006 |
| CN | 001872563 A | 12/2006 |
| CN | 101698935 A | 4/2010 |
| JP | 02-223438 | 9/1990 |
| JP | 1991264390 A | 11/1991 |
| JP | 2000167999 A | 6/2000 |
| JP | 2008-265080 | 11/2008 |
| JP | 2009205827 A | 9/2009 |
| JP | 2010-082964 | 4/2010 |

(Continued)

*Primary Examiner* — Bruce H Hess
(74) *Attorney, Agent, or Firm* — McKenna Long & Aldridge, LLP

(57) ABSTRACT

Disclosed is a transfer film which is transferred to an injection molding product. The transfer film includes a protective layer a printing layer which is stacked on the protective layer; a metal deposition layer which is deposited on the printing layer so as to have an island structure and thus to provide non-conductive property; and adhesive layer which is deposited on the metal deposition layer, thereby providing metal color and non-conductive property.

20 Claims, 8 Drawing Sheets

(56) References Cited

FOREIGN PATENT DOCUMENTS

| | | |
|---|---|---|
| JP | 2011-056679 | 3/2011 |
| KR | 10-2007-0074801 | 7/2007 |
| KR | 100816530 B1 | 3/2008 |
| KR | 10-2009-0014313 | 2/2009 |
| KR | 10-2009-0014313 A | 2/2009 |
| KR | 10-2010-0017100 | 2/2010 |
| KR | 10-2010-0044806 | 4/2010 |
| KR | 10-2010-0053094 | 5/2010 |
| KR | 10-2010-0086127 | 7/2010 |
| KR | 1020100086127 A | 7/2010 |
| TW | 200911535 | 3/2009 |
| TW | 201240819 A | 10/2012 |

\* cited by examiner

- 110 — protective layer
- 120 — printing layer
- 130 — deposition layer
- 140 — adhesive layer

- 210 — protective layer
- 220 — deposition layer
- 230 — printing layer
- 240 — adhesive layer

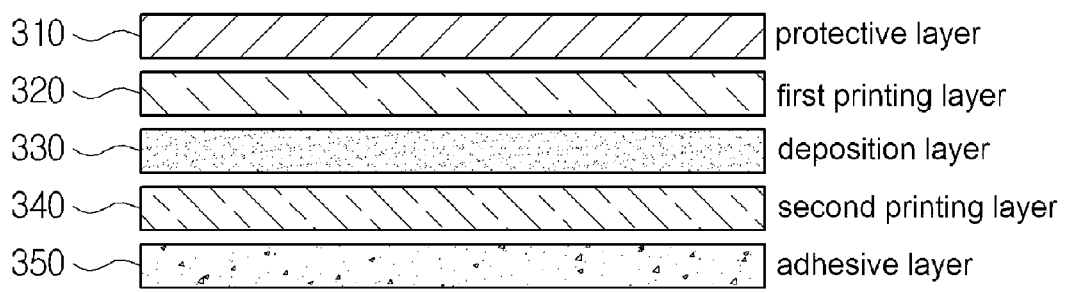
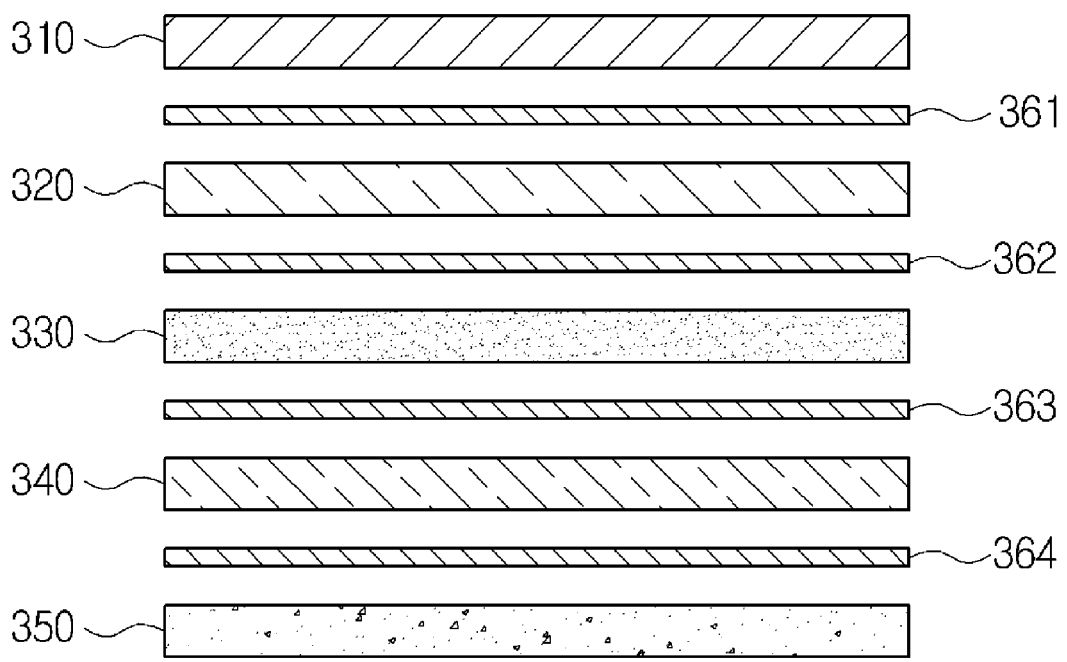

METAL-COLORED AND NON-CONDUCTIVE TRANSFER FILM

This application is a National Stage Entry of International Application No. PCT/KR2012/000274, filed Jan. 11, 2012, and claims the benefit of Korean Application No. 10-2011-0003411, filed on Jan. 13, 2011, which are hereby incorporated by reference in its entirety for all purposes as if fully set forth herein.

TECHNICAL FIELD

The present invention relates to a transfer film, and particularly to a metal-colored and non-conductive transfer film.

BACKGROUND ART

An in-mold injection molding method is being widely used to manufacture a front panel of a washing machine, an air-conditioner or the like, or an LCD window of a computer, a mobile phone or the like. In the in-mold injection molding method, a transfer film is installed between a fixed mold and a moving mold of an injection mold, and then melted resin is injected therein so that a pattern printed on the transfer film is transferred to an injection molding product at the same time of injection molding. Therefore, by using the in-mold injection molding method, injecting and transferring processes including injection, vacuum deposition, adhesion and the like can be reduced into one process, and thus manufacturing cost and defect rate can be considerably reduced.

In the in-mold injection molding method, the transfer film has a great influence on the quality of injection molding products. The transfer film generally includes a base film having releasing property, a protective layer which is stacked on the base film, a printing layer which is stacked on the protective layer and on which a predetermined pattern is printed, a deposition layer which is stacked on the printing layer, and an adhesive layer which is stacked on the deposition layer. After the injection molding process, the protective layer, the printing layer and the deposition layer are transferred to the injection molding product by the adhesive layer, and then the base film is separated and removed. Only a part of the protective layer which covers the printing layer is adhered on the injection molding product, and the rest parts thereof are removed with the base film.

In a conventional transfer film, a metallic material such as aluminum, copper, gold, silver, chrominum and titanium is deposited on the printing layer through vacuum deposition, sputtering deposition, electron beam vapor deposition and the like, thereby forming the deposition layer on the printing layer. Therefore, it is possible to embody inherent texture and color of each metallic material and thus to provide various metal colors to the transfer film.

However, in deposition layer of the conventional transfer film, if the metallic material such aluminum is deposited on the printing layer, metal particles forming the deposition layer are connected with each other without any gaps. As a result, a surface of the deposition layer has conductivity and also even radio waves cannot pass therethrough. This exerts an influence on reception and static transmission of signals, and thus it may cause damage to electronic components

DISCLOSURE OF INVENTION

Technical Problem

An object of the present invention is to provide a transfer film of which a deposition layer contains a metallic material for providing a metal color and also has non-conductive property so that radio signals can be transmitted therethrough and thus wireless communication can be performed even though the transfer film is used in an electronic product such as a computer, a mobile device and electrical appliances.

Solution to Problem

To achieve the object of the present invention, the present invention provides a transfer film which is transferred to an injection molding product, including a protective layer; a printing layer which is stacked on the protective layer; a metal deposition layer which is deposited on the printing layer so as to have an island structure and thus to provide non-conductive property; and an adhesive layer which is deposited on the metal deposition layer.

Preferably, the metal deposition layer is formed by a sputtering deposition method.

Preferably, the metal deposition layer contains Sn or In.

Preferably, a primer layer for increasing adhesion among the layers is provided at at least one of between the protective layer and the printing layer, between the printing layer and the metal deposition layer and between the metal deposition layer and the adhesive layer.

Further, present invention provides a transfer film which is transferred to an injection molding product, including a protective layer; a metal deposition layer which is deposited on the protective layer so as to have an island structure and thus to provide non-conductive property; a printing layer which is deposited on the metal deposition layer; and an adhesive layer which is deposited on the printing layer.

Preferably, the transfer film further includes a second printing layer which is stacked on the protective layer.

Preferably, the metal deposition layer is formed by a sputtering deposition method.

Preferably, the metal deposition layer contains Sn or In.

Preferably, a primer layer for increasing adhesion among the layers is provided at at least one of between the protective layer and the metal deposition layer, between the metal deposition layer and the printing layer and between the printing layer and the adhesive layer.

Advantageous Effects of Invention

According to the transfer film of present invention, since the deposition layer is formed of a metallic material, it is possible to provide a metal color. Further, since it has the non-conductive property even though it contains the metallic material, the wireless signals can be transmitted therethrough, and thus the wireless communication can be performed even though the transfer film is used in an electronic product such as a computer, a mobile device and electrical appliances.

BRIEF DESCRIPTION OF DRAWINGS

The above and other objects, features and advantages of the present invention will become apparent from the following description of preferred embodiments given in conjunction with the accompany drawings, in which:

FIGS. 3a and 3b are views showing a transfer film according to a third embodiment of the present invention.

FIG. 5b is a view showing a case that the primer layer forming step is further included in a manufacturing method according to the second embodiment of FIG. 5a.

FIG. 6b is a view showing a case that the primer layer forming step is further included in a manufacturing method according to the third embodiment of FIG. 6a.

DETAILED DESCRIPTION OF MAIN ELEMENTS

110: protective layer 120: printing layer
130: deposition layer 140: adhesive layer

BEST MODE FOR CARRYING OUT THE INVENTION

Hereinafter, the embodiments of the present invention will be described in detail.

Figure 1A:
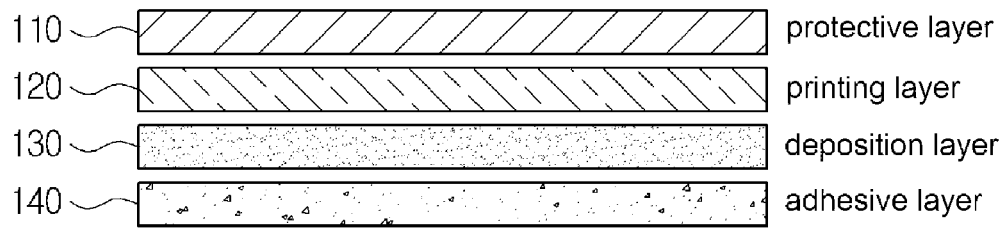
FIG. 1a is a view showing a transfer film according to a first embodiment of the present invention.

FIG. 1a is a view showing a transfer film according to a first embodiment of the present invention.

As shown in FIG. 1a, the first embodiment of the present invention includes a protective layer 110, a printing layer 120, a deposition layer 130 and an adhesive layer 140.

The protective layer 110 is stacked on a base film. The base film functions to keep a shape of the transfer film, and is formed of one or a combination of a polyester resin, a polypropylene resin, a polyamide resin, a polyethylene resin and a triacetate resin. Typically, the base film has a thickness of 20-50 μm.

A releasing layer may be stacked on the base film. The releasing layer functions to separate the base layer from an injection molding product after an injection molding process. The releasing layer is generally formed of wax, silicon, teflon, melamine, urethane and the like. The releasing layer has a thickness of 1 μm. If the base film has the releasing layer, it is not necessary to form a separate releasing layer.

The protective layer 110 is stacked on the base film or the releasing layer. The protective layer 110 functions to protect the printing layer 120, the deposition layer 130 and the adhesive layer 140 after the releasing layer is separated. For example, the protective layer 110 may be comprised of 85~98 weight % of an ultraviolet curable resin and 2~15 weight % of a ketone resin. The ultraviolet curable resin as a main component may contains an acrylic monomer, an epoxy or urethane oligomer, a photo initiator and an additive.

The printing layer 120 is stacked on the protective layer 110. The printing layer 120 is formed of an acrylic or polyurethane resin, a melamine resin or a polyamide resin, and contains various dyes or pigments. The printing layer 120 has predetermined patterns and colors and typically has a thickness of 1~2 μm.

The deposition layer 130 is stacked on the printing layer 120. The deposition layer 130 contains a metallic material so as to provide a metal color. The metallic material may include aluminum, nickel, copper, gold, platinum, silver, chrome, iron, titanium and the like. However, in the present invention, since it is required that the deposition layer 130 has a non-conductive property as well as the metal color, Sn or In is used as the metallic material. When depositing Sn or In by using a sputtering method, deposition particles of Sn or In form an island structure on a deposited surface. If the deposition layer 130 is formed into the surface island structure, gaps are formed among the islands. As a result, the deposition layer 130 has the non-conductive property, and thus radio waves can be transmitted therethrough.

Meanwhile, if the thickness of the deposition layer 130 is increased, the surface island structure is also reduced, and the transmission of the radio waves is lowered. Therefore, it is required that the deposition layer 130 is formed to be not larger than a predetermined thickness. In the transmittance with respect to the thickness of the deposition layer 130 (in case of Sn), the transmittance was 10% in a thickness of 45~50 nm, but the transmittance was lowered to 5% in a thickness of 10 nm. Meanwhile, in a sheet resistance with respect to the thickness, the deposition layer 130 had a sufficient value of the sheet resistance in a thickness of 50 nm. However, in a thickness of 100 nm or more, the deposition layer 130 had the non-conductive property, but the sheet resistance was very low. Of course, the sheet resistance and the transmittance with respect to the thickness may be changed according to deposition conditions.

The adhesive layer 140 is formed of an acrylic or vinyl adhesive, and functions to bond the transfer film to an injection molding product. The adhesive layer 140 has a thickness of 1~2 μm.

Figure 1B:
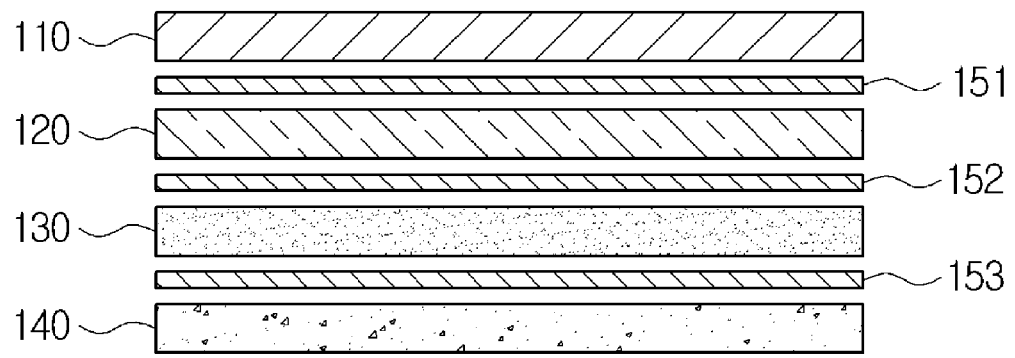
FIG. 1b is a view showing a case that a primer layer is included in the first embodiment of the present invention.

FIG. 1b is a view showing a case that a primer layer is included in the first embodiment of the present invention.

As shown in FIG. 1b, the first embodiment having the primer layer according to the present invention includes a primer layer 151, 152, 153 for increasing adhesion among the layers of the transfer film. The primer layer 151, 152, 153 is comprised of 90 ~98 weight % of a polyvinyl-butyral resin and 2~10 weight % of polyethyleneimine. Since the polyethyleneimine as an active material contained in the primer layer 151, 152, 153 is tacky and is also limited in selecting a solvent, it is used together with, for example, the polyvinyl-butyral resin which is dissolved in alcohol. The polyvinyl-butyral resin typically has a thickness of 1~2 μm.

In FIG. 1b, the primer layer is inserted among all of the layers of FIG. 1a. However, the primer layer may be selectively inserted, as occasion demands.

Figure 2A:
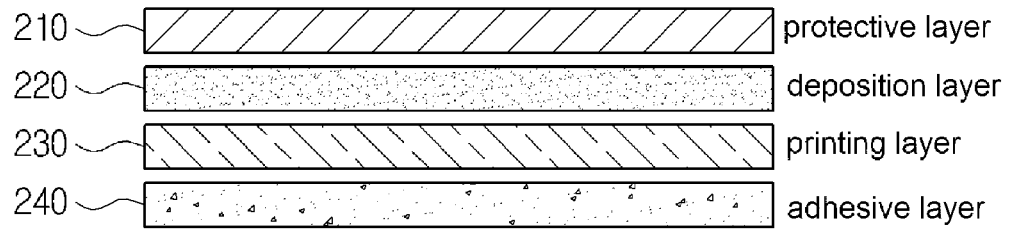
FIGS. 2a and 2b are views showing a transfer film according to a second embodiment of the present invention.
Figure 2B:
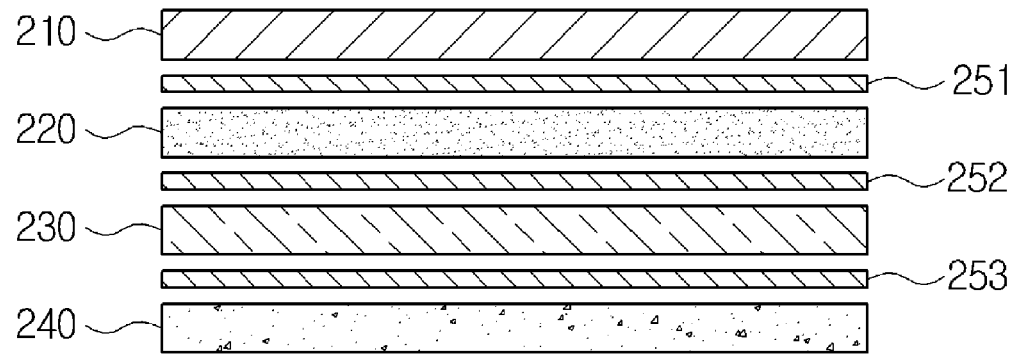

FIGS. 2a and 2b are views showing a transfer film according to a second embodiment of the present invention.

In the second embodiment, as shown in FIGS. 2a and 2b, a protective layer 210 and an adhesive layer 240 are located at the same position as in the first embodiment, and positions of a printing layer 230 and a deposition layer 220 are changed with each other. By such the structure, it is possible to change the feeling of combination of patterns and colors of the printing layer 230 and the metal color of the deposition layer 220.

FIGS. 3a and 3b are views showing a transfer film according to a third embodiment of the present invention.

In the third embodiment, as shown in FIGS. 3a and 3b, a protective layer 310 and an adhesive layer 350 are located at the same position as in the first embodiment of FIGS. 1a and 1b and the second embodiment of FIGS. 2a and 2b, and a printing layer 320 or 340 further provided at an opposite side of another printing layer so as to be adjacent to a deposition layer 330. By such the structure, it is possible to provide various patterns and colors.

Figure 4A:
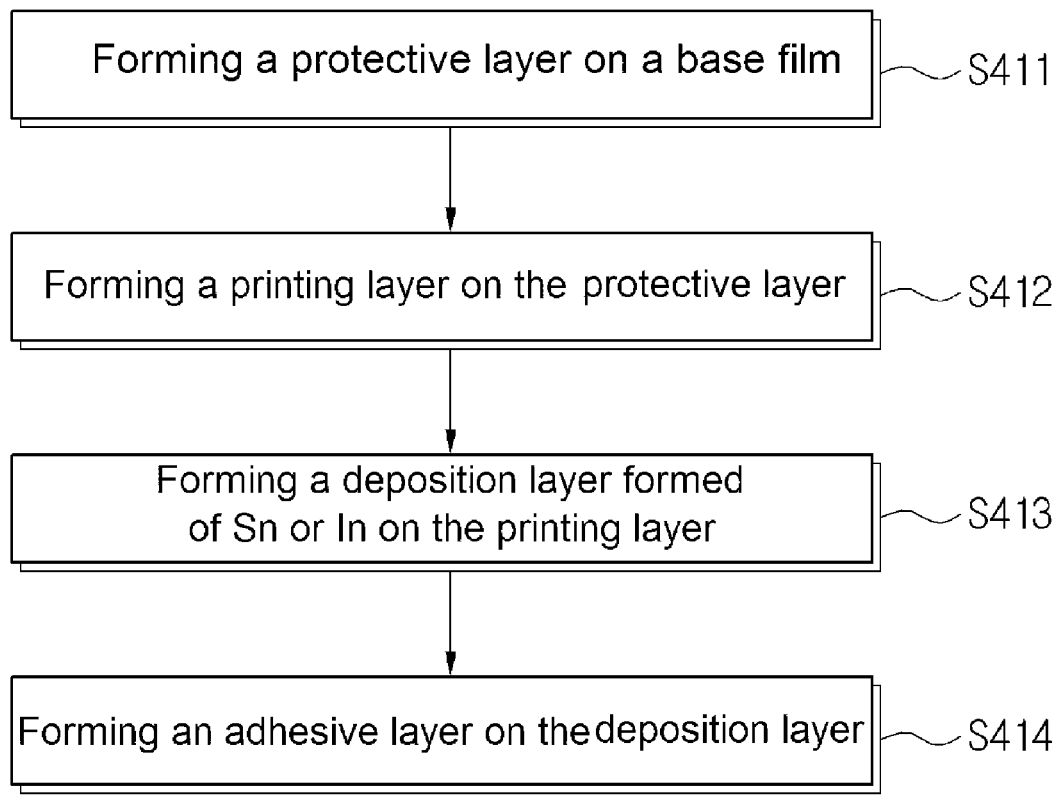
FIG. 4a is a view showing a process of manufacturing the transfer film according to the first embodiment of the present invention.

FIG. 4a is a view showing a process of manufacturing the transfer film according to the first embodiment of the present invention.

As shown in FIG. 4a, a manufacturing method of the first embodiment is started from a step S411 of forming the protective layer on the base film. A step of inserting the primer layer between the base film and the protective layer may be further included. However, since the base film is removed later, there is no point to insert the primer layer for increasing adhesion between the base film and the protective layer.

Then, a step S412 of forming the printing layer on the protective layer, a step S413 of forming the deposition layer formed of Sn or In on the printing layer and a step S414 of forming the adhesive layer on the deposition layer are carried out continuously.

Figure 4B:
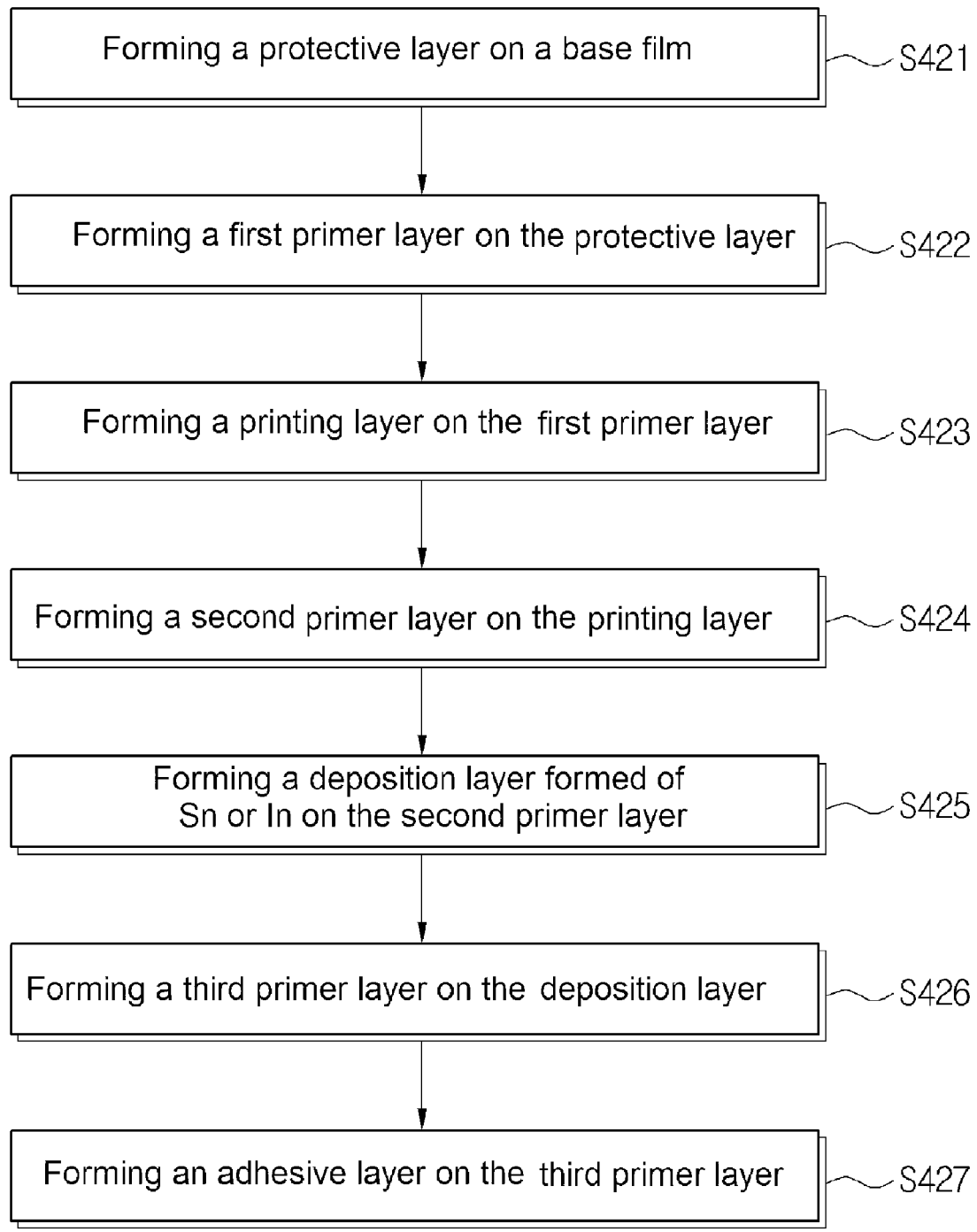
FIG. 4b is a view showing a case that a primer layer forming step is included in a manufacturing method according to the first embodiment of the present invention.

FIG. 4b is a view showing a case that a primer layer forming step is included in a manufacturing method according to the first embodiment of the present invention.

As shown in FIG. 4b, a primer layer forming step for increasing the adhesion among the layers, i.e., a first primer layer forming step S422, a second primer layer forming step S424 and a third primer layer forming step S426 are respectively provided among a protective layer forming step S421, a printing layer forming step S423, a deposition layer forming step S425 of forming a deposition layer formed of Sn or In, and an adhesive layer forming step S427.

As detailed example, a film formed of a polyester resin is used as the base film, and the releasing layer formed of silicon and having a thickness of 0.5 μm is gravure-coated thereon. After a mixed resin comprised of 90 weight % of a ultraviolet curable resin and 10 weight % of a ketone resin is gravure-coated on the releasing layer, VU light is irradiated from a UV lamp thereof so as to form the protective layer having a thickness of 2.5 μm.

Then, a mixed resin comprised of 5 weight % of polyethyleneimine and 95 weight % of a polyvinyl-butyral resin is gravure-coated thereon so as to form a first primer layer, and then the first primer is dried for 10 seconds at 90° C. And a printing layer is formed using an acrylic resin including pigments, and a mixed resin comprised of 5 weight % of polyethyleneimine and 95 weight % of a polyvinyl-butyral resin is gravure-coated thereon so as to form a second primer layer, and then the second primer is dried for 10 seconds at 90° C.

And Sn or In is deposited on the second primer layer by a sputtering deposition method so as to have a thickness of 50 nm. Herein, the deposition layer is formed to have the surface island structure. A mixed resin comprised of 5 weight % of polyethyleneimine and 95 weight % of a polyvinyl-butyral resin is gravure-coated on the deposition layer so as to form a third primer layer, and then the third primer is dried for 10 seconds at 90° C.

On the third primer layer, the adhesive layer having a thickness of 1 μm is formed using an acrylic adhesive. Thus, the transfer film having the primer layers is completed.

Figure 5A:
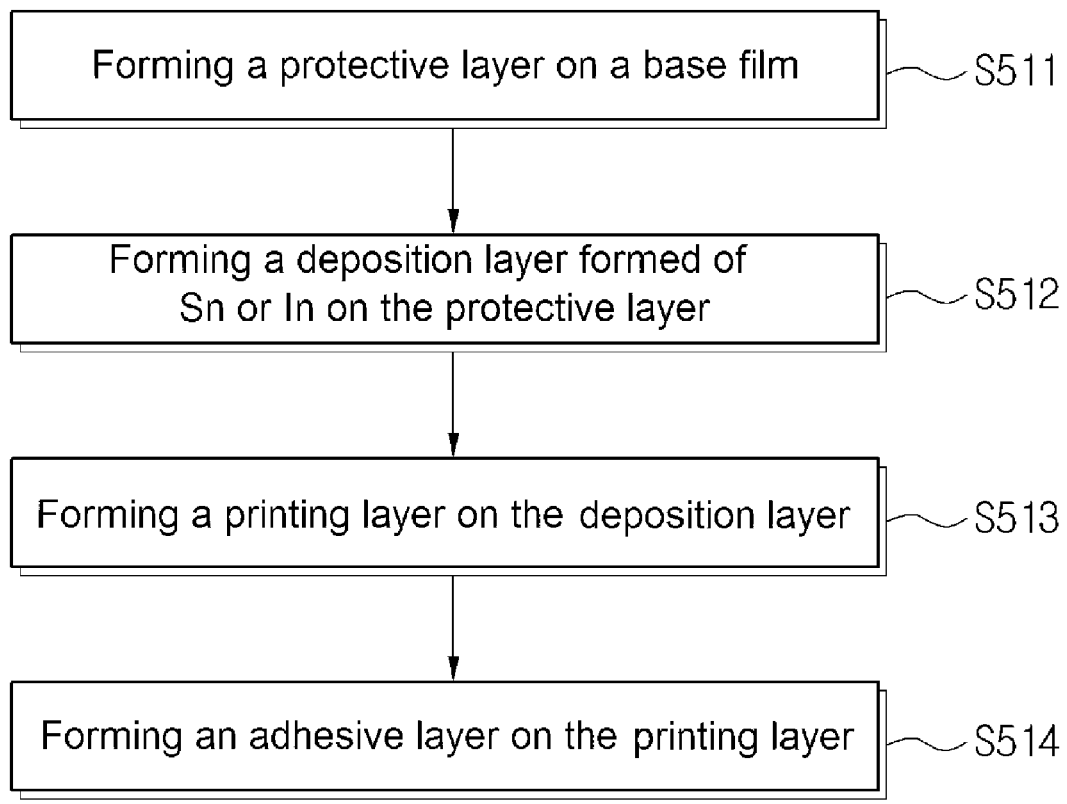
FIG. 5a is a view showing a process of manufacturing the transfer film according to the second embodiment of the present invention.

FIG. 5a is a view showing a process of manufacturing the transfer film according to the second embodiment of the present invention.

As shown in FIG. 5a, a manufacturing method of the second embodiment is started from a step S511 of forming the protective layer on a base film. And then, a deposition layer forming step S512 of forming a deposition layer formed of Sn or In on the protective layer, a printing layer forming step S513 of forming a printing layer on the deposition layer, and an adhesive layer forming step S514 of forming an adhesive layer on the printing layer are carried out. As described above, in the manufacturing method of the second embodiment of FIG. 5a, the order of the deposition layer forming step and the printing layer forming step in the manufacturing method of the first embodiment is reversed. Because the rest steps in the manufacturing method of the second embodiment are the same as in the manufacturing method of the first embodiment, the description thereof will be omitted.

Figure 5B:
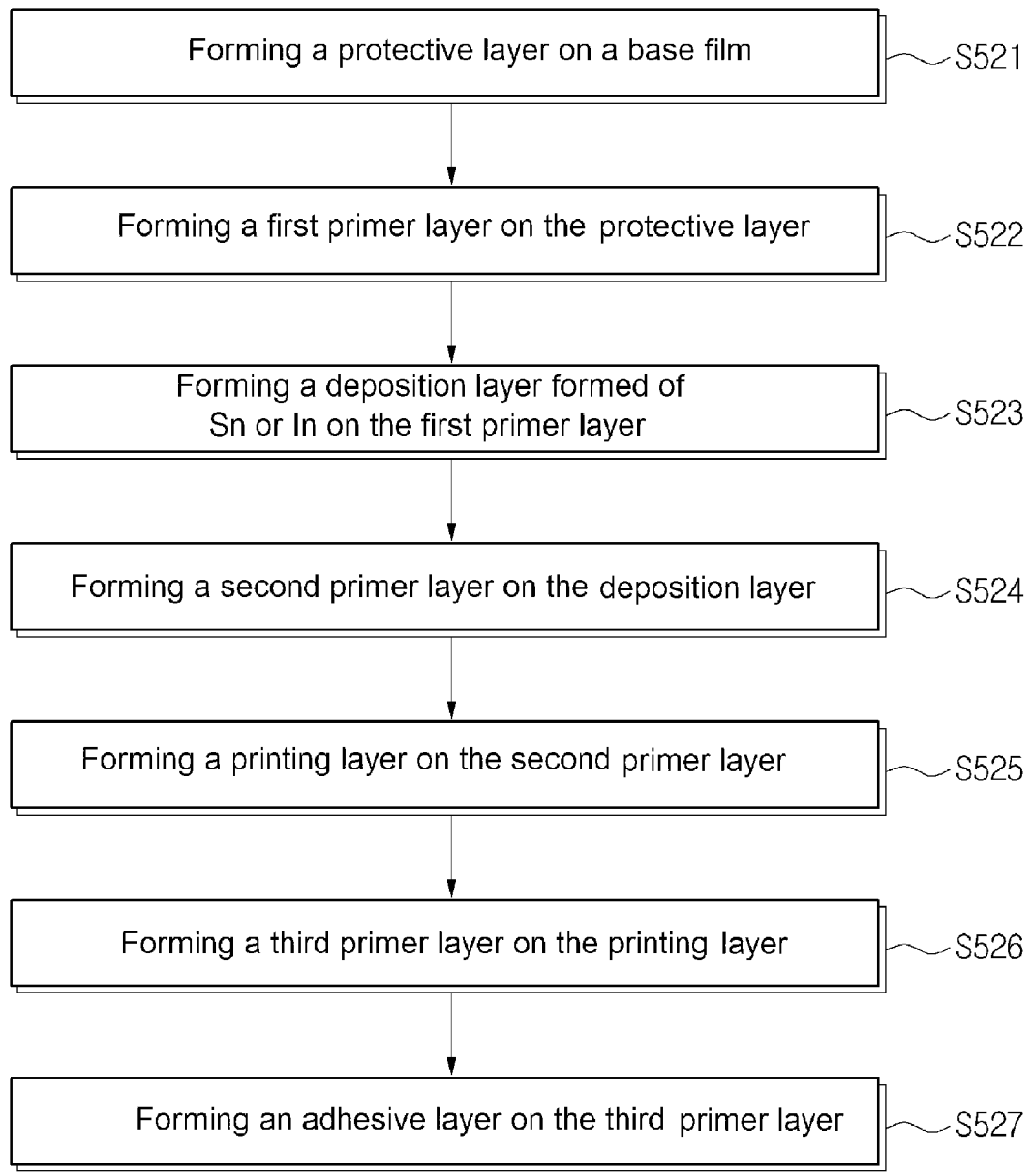

FIG. 5b is a view showing a case that the primer layer forming step is further included in a manufacturing method according to the second embodiment of FIG. 5a.

As shown in FIG. 5b, a primer layer forming step for increasing the adhesion of each layer, i.e., a first primer layer forming step S522, a second primer layer forming step S524 and a third primer layer forming step S526 are respectively provided among a protective layer forming step S521, a deposition layer forming step S523 of forming a deposition layer formed of Sn or In, a printing layer forming step S525, and an adhesive layer forming step S527.

Figure 6A:
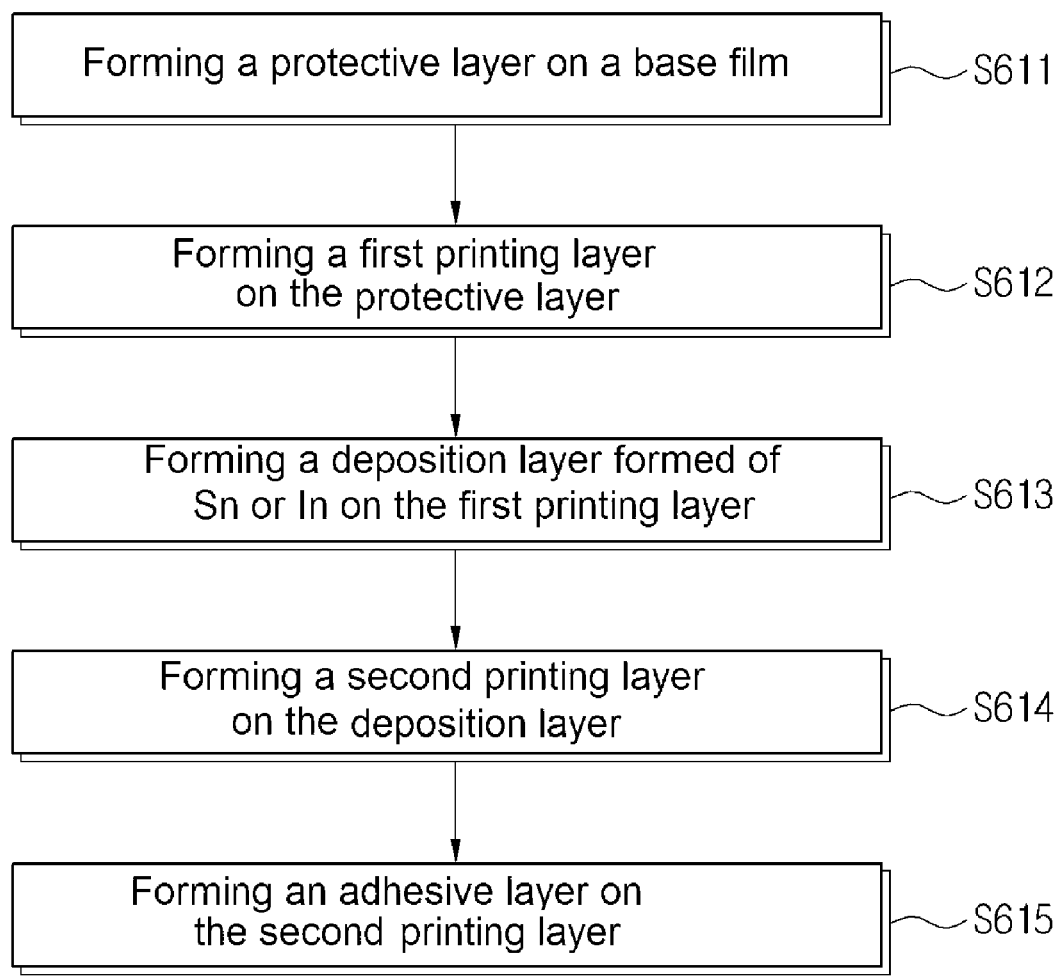
FIG. 6a is a view showing a process of manufacturing the transfer film according to the third embodiment of the present invention.

FIG. 6a is a view showing a process of manufacturing the transfer film according to the third embodiment of the present invention.

As shown in FIG. 6a, a manufacturing method of the third embodiment is started from a step S611 of forming the protective layer on a base film. Then, a first printing layer is formed on the protective layer (S611). And then, a deposition layer forming step S613 of forming a deposition layer formed of Sn or In on the first printing layer, a second printing layer forming step S614 of forming a second printing layer on the deposition layer, and an adhesive layer forming step S614 of forming an adhesive layer on the second printing layer are carried out. As described above, in the manufacturing method of the third embodiment of FIG. 6a, unlike in the manufacturing methods of the first and second embodiment, the first and second printing layer forming steps are further included before and after the deposition layer forming step.

Figure 6B:
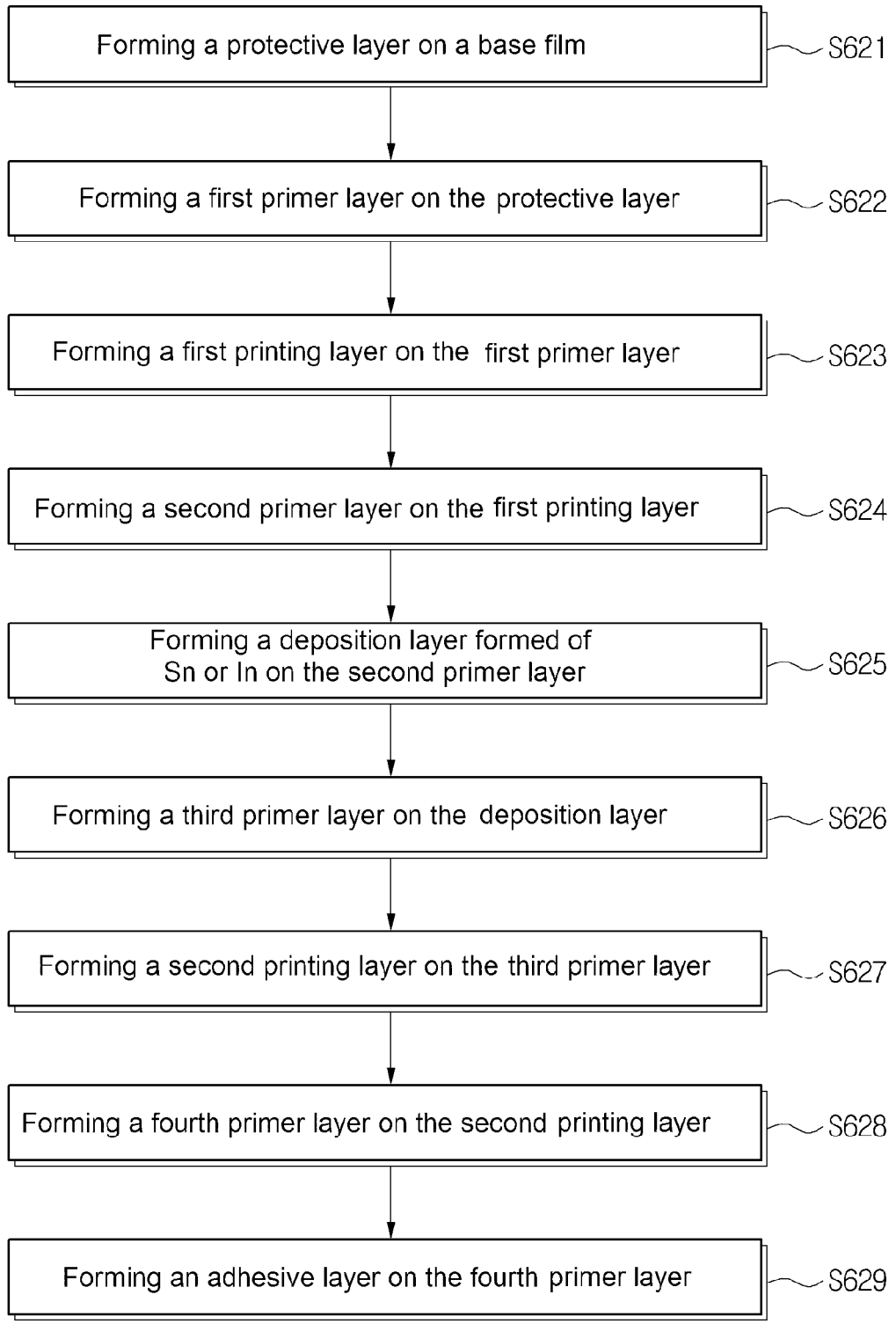

FIG. 6b is a view showing a case that the primer layer forming step is further included in a manufacturing method according to the third embodiment of FIG. 6a.

As shown in FIG. 6a, a primer layer forming step for increasing the adhesion of each layer, i.e., a first primer layer forming step S622, a second primer layer forming step S624, a third primer layer forming step S626 and a fourth primer layer forming step S628 are respectively provided among a protective layer forming step S621, a first printing layer forming step S627, a deposition layer forming step S625 of forming a deposition layer formed of Sn or In, a second printing layer forming step S627, and an adhesive layer forming step S629.

INDUSTRIAL APPLICABILITY

As described above, in the method of manufacturing the transfer film according to the present invention, the transfer film is indirectly deposited on the injection molding product through a roll-to-roll method instead of a sputtering deposition method or an evaporation deposition method. Therefore, it is advantage in mass production operations.

While the present invention has been described with respect to the specific embodiments, it will be apparent to those skilled in the art that various changes and modifications may be made without departing from the spirit and scope of the invention as defined in the following claims.

The invention claimed is:
1. A transferable film which is transferred to an injection molding product, comprising:
a protective layer;
a printed layer which is stacked on the protective layer;

a metal deposition layer which is deposited on the printed layer so as to have an island structure and thus to provide non-conductive property; and an adhesive layer which is deposited on the metal deposition layer.

2. The transferable film according to claim 1, wherein the metal deposition layer is formed by a sputtering deposition method.

3. The transferable film according to claim 2, wherein the metal deposition layer contains Sn.

4. The transferable film according to claim 3, wherein a primer layer for increasing adhesion among the layers is provided between at least one of the protective layer and the printed layer, the printed layer and the metal deposition layer and the metal deposition layer and the adhesive layer.

5. The transferable film according to claim 2, wherein the metal deposition layer contains In.

6. The transferable film according to claim 5, wherein a primer layer for increasing adhesion among the layers is provided between at least one of the protective layer and the printed layer, the printed layer and the metal deposition layer and the metal deposition layer and the adhesive layer.

7. The transferable film according to claim 2, wherein a primer layer for increasing adhesion among the layers is provided between at least one of the protective layer and the printed layer, the printed layer and the metal deposition layer and the metal deposition layer and the adhesive layer.

8. The transferable film according to claim 1, wherein a primer layer for increasing adhesion among the layers is provided between at least one of the protective layer and the printed layer, the printed layer and the metal deposition layer and the metal deposition layer and the adhesive layer.

9. A transferable film which is transferred to an injection molding product, comprising:

a protective layer;

a metal deposition layer which is deposited on the protective layer so as to have an island structure and thus to provide non-conductive property;

a printed layer which is deposited on the metal deposition layer; and an adhesive layer which is deposited on the printed layer.

10. The transferable film according to claim 9, wherein the metal deposition layer is formed by a sputtering deposition method.

11. The transferable film according to claim 10, wherein the metal deposition layer contains Sn.

12. The transferable film according to claim 11, further comprising a second printed layer which is stacked on the protective layer.

13. The transferable film according to claim 11, wherein a primer layer for increasing adhesion among the layers is provided between at least one of the protective layer and the metal deposition layer, the metal deposition layer and the printed layer and the printed layer and the adhesive layer.

14. The transferable film according to claim 10, wherein the metal deposition layer contains In.

15. The transferable film according to claim 14, further comprising a second printed layer which is stacked on the protective layer.

16. The transferable film according to claim 14, wherein a primer layer for increasing adhesion among the layers is provided between at least one of the protective layer and the metal deposition layer, the metal deposition layer and the printed layer and the printed layer and the adhesive layer.

17. The transferable film according to claim 10, further comprising a second printed layer which is stacked on the protective layer.

18. The transferable film according to claim 10, wherein a primer layer for increasing adhesion among the layers is provided between at least one of the protective layer and the metal deposition layer, the metal deposition layer and the printed layer and the printed layer and the adhesive layer.

19. The transferable film according to claim 9, further comprising a second printing layer which is stacked on the protective layer.

20. The transferable film according to claim 9, wherein a primer layer for increasing adhesion among the layers is provided between at least one of the protective layer and the metal deposition layer, the metal deposition layer and the printed layer and the printed layer and the adhesive layer.

* * * * *